(12) United States Patent
Shimizu et al.

(10) Patent No.: US 12,399,160 B2
(45) Date of Patent: Aug. 26, 2025

(54) COLUMN CONNECTION METHOD OF LIQUID CHROMATOGRAPH, AND LIQUID CHROMATOGRAPH

(71) Applicant: Hitachi High-Tech Corporation, Tokyo (JP)

(72) Inventors: Yusuke Shimizu, Tokyo (JP); Takayuki Sugime, Tokyo (JP); Sho Iwasa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 258 days.

(21) Appl. No.: 18/037,808

(22) PCT Filed: Dec. 7, 2021

(86) PCT No.: PCT/JP2021/044925
§ 371 (c)(1),
(2) Date: May 19, 2023

(87) PCT Pub. No.: WO2022/131075
PCT Pub. Date: Jun. 23, 2022

(65) Prior Publication Data
US 2024/0011955 A1   Jan. 11, 2024

(30) Foreign Application Priority Data
Dec. 16, 2020  (JP) .................. 2020-208207

(51) Int. Cl.
*G01N 30/60* (2006.01)
*B01D 15/18* (2006.01)
*G01N 30/02* (2006.01)

(52) U.S. Cl.
CPC ............ *G01N 30/60* (2013.01); *B01D 15/18* (2013.01); *G01N 2030/027* (2013.01)

(58) Field of Classification Search
CPC ............ G01N 30/60; G01N 2030/027; G01N 2030/8804; G01N 35/00732; G01N 30/86; B01D 15/18
See application file for complete search history.

(56) References Cited

U.S. PATENT DOCUMENTS 7,303,139 B1 * 12/2007 Rudloff ................ G01N 35/025
                                                                235/494
2002/0088946 A1   7/2002 Hofmann et al.
(Continued)

FOREIGN PATENT DOCUMENTS

JP   2008-107136 A   5/2008
JP   2011-99679 A    5/2011
(Continued)

OTHER PUBLICATIONS

International Search Report (PCT/ISA/210) issued in PCT Application No. PCT/JP2021/044925 dated Jan. 18, 2022 with English translation (four (4) pages).
(Continued)

*Primary Examiner* — David J Bolduc
(74) *Attorney, Agent, or Firm* — Crowell & Moring LLP (57) ABSTRACT

A column connection method of a liquid chromatograph and a liquid chromatograph capable of keeping a mistakenly installed column by an operator as an unused column are provided. The column connection method of the liquid chromatograph includes: a first step of installing a column at a column installation part and obtaining a first reading result by reading identification information of the column before connecting the column with an analysis flow path; and a second step of connecting the column with the analysis flow path and obtaining a second reading result by reading
(Continued)

identification information of the column, in which the first reading result is compared with the second reading result to judge identity of the column.

6 Claims, 6 Drawing Sheets

(56) References Cited

U.S. PATENT DOCUMENTS

| | | | |
|---|---|---|---|
| 2006/0199196 A1* | 9/2006 | O'Banion | G06Q 10/08 |
| | | | 435/7.1 |
| 2008/0235081 A1* | 9/2008 | Davison | G06Q 30/0202 |
| | | | 705/28 |
| 2010/0123551 A1* | 5/2010 | Fritchie | G16H 10/40 |
| | | | 340/10.1 |
| 2011/0232372 A1* | 9/2011 | Tokunaga | H01Q 1/2216 |
| | | | 422/50 |
| 2012/0175289 A1* | 7/2012 | Bystron | B01D 15/10 |
| | | | 33/700 |
| 2018/0080948 A1* | 3/2018 | Yabutani | G01N 21/82 |
| 2020/0386725 A1* | 12/2020 | Ozbal | G01N 30/82 |
| 2021/0270864 A1* | 9/2021 | Chiappetta | G01N 35/00584 |

FOREIGN PATENT DOCUMENTS

| | | |
|---|---|---|
| JP | 2011-117815 A | 6/2011 |
| JP | 2011-220789 A | 11/2011 |
| JP | 5345970 B2 | 11/2013 |
| JP | 2020-148604 A | 9/2020 |

OTHER PUBLICATIONS

Japanese-language Written Opinion (PCT/ISA/237) issued in PCT Application No. PCT/JP2021/044925 dated Jan. 18, 2022 (three (3) pages).

* cited by examiner

COLUMN CONNECTION METHOD OF LIQUID CHROMATOGRAPH, AND LIQUID CHROMATOGRAPH

TECHNICAL FIELD

The present invention relates to a column connection method of a liquid chromatograph, and a liquid chromatograph.

BACKGROUND ART

Chromatography is used as an analysis method using a column. As an example, the column is obtained by filling a filler of particles in which various functional groups are bonded to a mother material such as silica gel or polymer gel in a cylindrical elongated container at a high pressure. The chromatography is a method in which each substance is distributed at a constant ratio due to a difference in affinity (interaction) between a stationary phase and a mobile phase flowing in contact therewith, and each substance is separated by utilizing a fact that the ratio differs depending on the substance. Liquid chromatography uses a liquid as the mobile phase.

Since the stationary phase and the mobile phase have counter electrode properties such as high and low polarity properties or acid and alkali depending on an object to be analyzed, an analyst has to select the object to be analyzed suitable for both the stationary phase and the mobile phase.

In PTL 1, a management electronic tag is provided for each column, and a liquid feeding condition, a temperature condition, and the like of a chromatograph recommended before an analysis process are detected. An analysis system, is constructed, in which the chromatograph controls under an appropriate condition based on detected information.

CITATION LIST

Patent Literature

PTL 1: JP5345970B

SUMMARY OF INVENTION

Technical Problem

In PTL 1, since a step of reading information is performed after the column is attached to a column oven of the chromatograph, an inlet/outlet portion of the column is connected to an analysis flow path before identification. Therefore, when an operator attaches a mistaken column, the column comes into contact with the analysis flow path and is equivalent to a used column, and when the stationary phase and the mobile phase are in an inappropriate combination, a quality of the column cannot be kept.

An object of the invention is to provide a column connection method of a liquid chromatograph and a liquid chromatograph capable of keeping a mistakenly installed column by an operator as an unused column.

Solution to Problem

In order to solve the above problem, for example, a configuration described in claims is adopted.

The present application includes a plurality of means for solving the above problem, and an example thereof is a column connection method of a liquid chromatograph, including: a first step of installing a column at a column installation part and reading identification information of the column before connecting the column with an analysis flow path to obtain a first reading result; and a second step of connecting the column with the analysis flow path and reading the identification information of the column to obtain a second reading result. The first reading result is compared with the second reading result to judge identity of the column.

Advantageous Effects of Invention

The invention can provide the column connection method of a liquid chromatograph and the liquid chromatograph capable of keeping a mistakenly installed column by an operator as an unused column.

Problems, configurations, and effects other than those described above will be clarified by the following description of embodiments.

DESCRIPTION OF EMBODIMENTS

Hereinafter, embodiments of the invention will be described with reference to the drawings.

In the following embodiments, liquid chromatography (HPLC) is described as an example, and the invention is applicable to general analyzers. The invention can also be applied to a clinical examination device including, for example, gas chromatography, ultra-high performance liquid chromatography, HPLC/MS, and a column separation unit.

Embodiment 1

A general HPLC includes a liquid feeding pump, an injector, a column, a column oven for adjusting a temperature of the column, and a pipe for connecting the liquid feeding pump, the injector, and the separation column. A configuration of an entire device according to the present embodiment is a multi-stream HPLC device in which a plurality of HPLC flow paths are coupled to one detection unit via a stream select valve for switching the HPLC flow paths, and analysis can be performed mutually. The HPLC flow paths have the same configuration and are arranged in parallel. Since the column itself is a consumable that is periodically exchanged, the analysis flow path and the column are periodically attached and detached.

The column includes a management electronic tag (hereinafter, referred to as a column tag) in which a manufacturing time and a recommended analysis condition are recorded in advance. Instead of the column tag, information can be managed by a bar code or the like attached to a column body.

A positional relation in which the column tag is parallel to a reading device is desirable. However, since the column body generally has a cylindrical shape, it is desirable that a portion provided with a tag is flat or the column itself is sealed in a rectangular parallelepiped cartridge and a column tag is provided on the cartridge.

A connection mechanism (column connection mechanism) between a column and an analysis flow path will be described with reference to FIG. 1 (front view) and FIG. 2 (top view).

A column 101 provided with a column tag 102, an inlet-side flow path 103, and an outlet-side flow path 104 are positioned on a straight line (Y coordinate and Z coordinate are equal), and the inlet-side flow path 103 and the outlet-side flow path 104 are arranged such that the respective flow paths can be detached from a column 101 by performing linear motion.

The inlet-side flow path 103 and the outlet-side flow path 104 are made of stainless steel having an inner diameter of 0.1 mm and an outer diameter of ¹⁄₁₆ inches (≈1.59 mm). A diameter and a material are not limited thereto, and can be appropriately set.

An inlet-side guide rail 106 and an inlet-side guide block 107 of the inlet-side flow path 103 are disposed on an exchange mechanism base 105, and perform the linear motion of the inlet-side flow path 103. In FIG. 1, a rail-shaped guide and a block are illustrated, and the linear motion may be implemented such as a shaft and a bush. The outlet-side flow path 104 is disposed symmetrically with an inlet side with respect to a center of the column 101. Similarly to the inlet-side guide rail 106 and the inlet-side guide block 107, an outlet-side guide rail 108 and an outlet-side guide block 109 that performs the linear motion of the outlet-side flow path 104 are also disposed symmetrically with respect to the center of the column 101.

An inlet-side flow path base 110 and an inlet-side flow path guide block 111 are disposed on the inlet-side guide block 107. Following the motion of the inlet-side guide block 107, the inlet-side flow path 103 is inserted into an inlet of the column 101.

Similarly to the inlet side, an outlet-side flow path base 112 and an outlet-side flow path guide 113 are disposed on the outlet-side guide block 109. Following the motion of the outlet-side guide block 109, the outlet-side flow path 104 is inserted into an outlet of the column 101.

Figure 1:
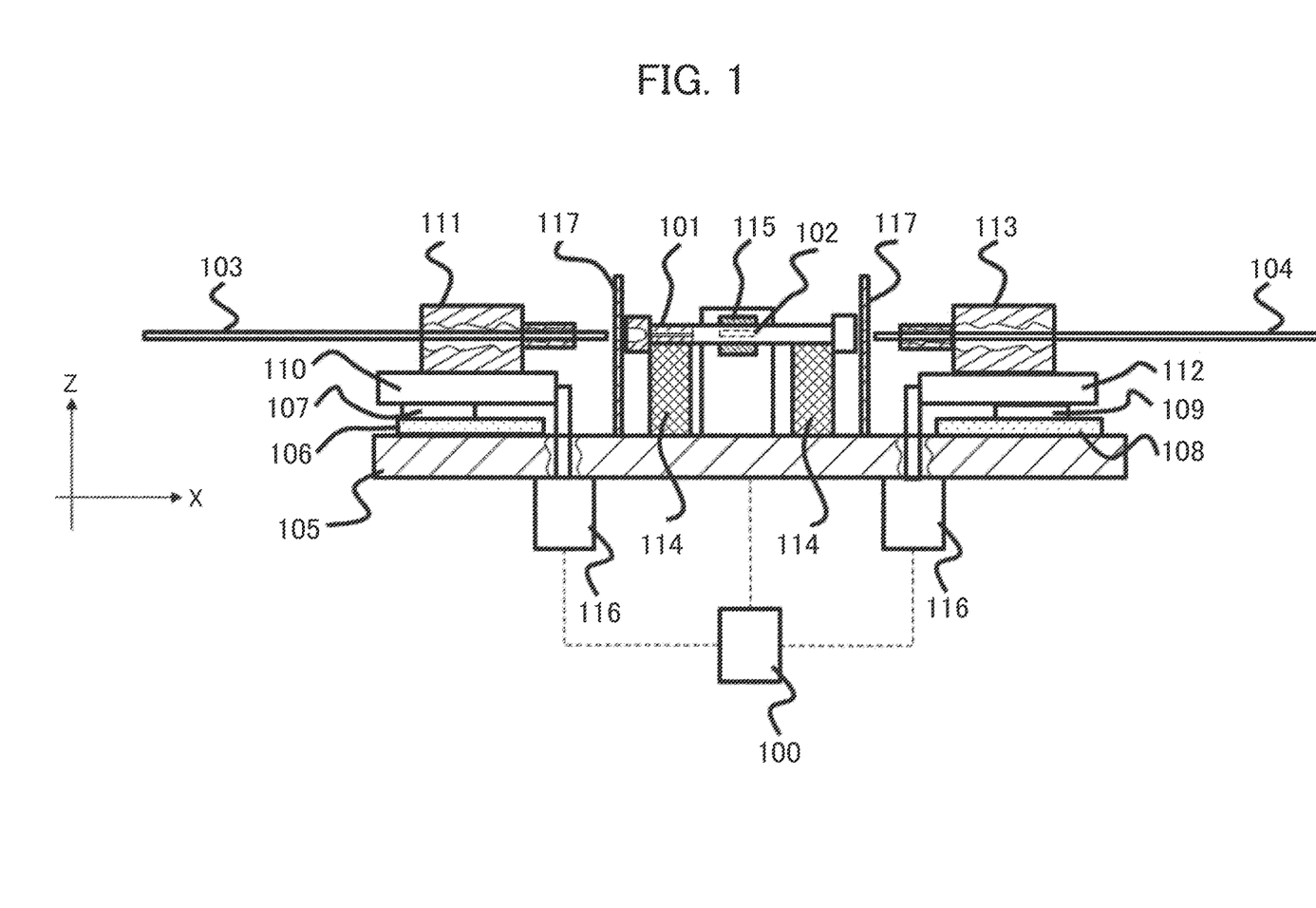
FIG. 1 is a front view of a column connection mechanism according to Embodiment 1.
Figure 2:
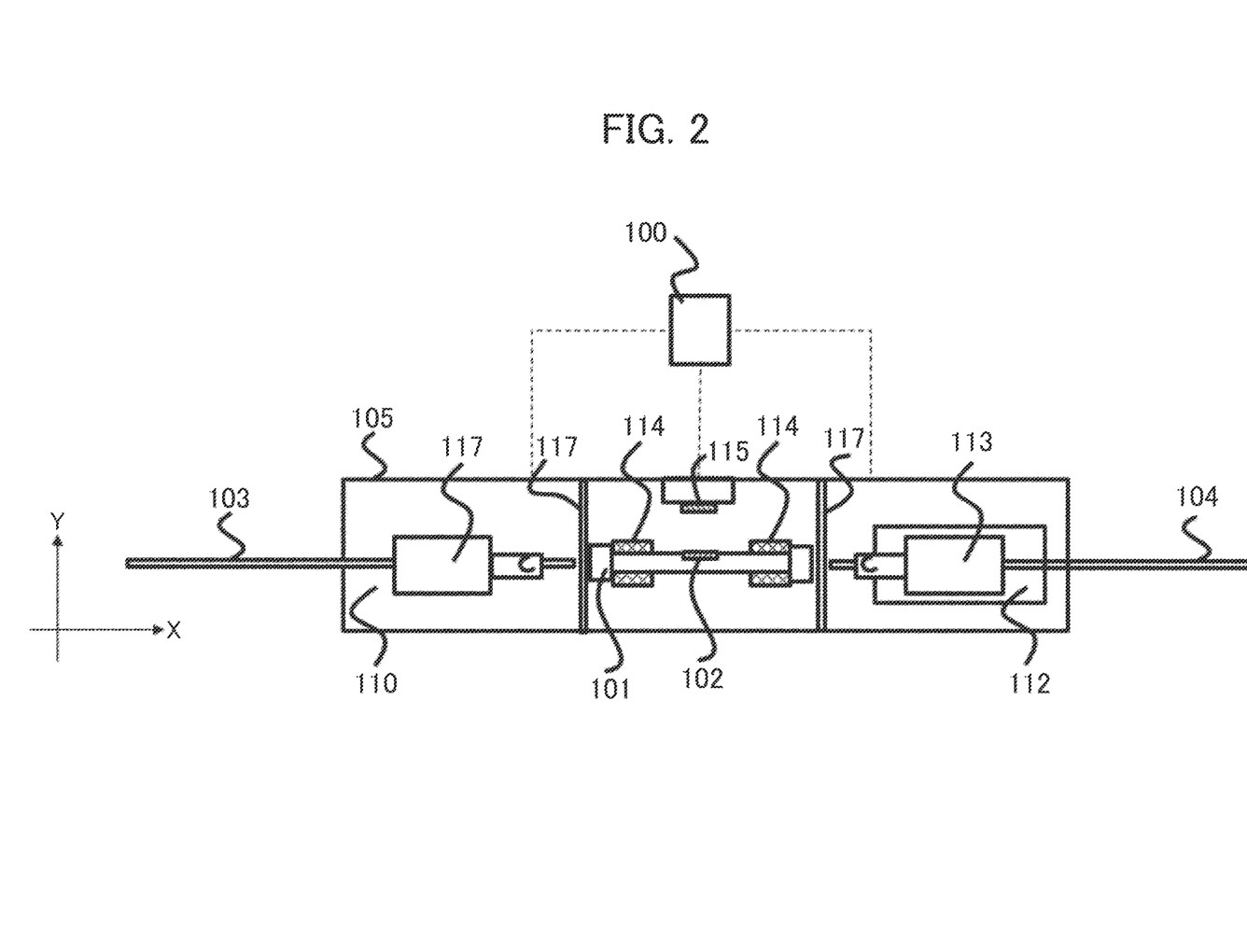
FIG. 2 is a top view of the column connection mechanism according to Embodiment 1.

When the column 101 is installed on column rests 114, a reading device 115 is disposed on a straight line parallel to a depth direction of a paper surface of FIG. 1 with respect to a center position of the column tag 102 (X coordinate and Z coordinate are equal).

Until the reading device 115 reads the column tag 102 (first reading) and correct or incorrect of the installed column 101 is confirmed, the linear motion of the inlet-side flow path 103 and the outlet-side flow path 104 is restricted by electromotive locks 116 whose distal end rods perform an extraction and retraction operation so as not to contact the inlet-side flow path 103 and the outlet-side flow path 104. Examples of the electromotive lock 116 include an electromagnetic solenoid, a pneumatic cylinder, and a hydraulic cylinder that perform the linear motion.

When the column 101 is installed on the column rests 114, column protection covers 117 are installed on the inlet-side and the outlet-side of the column 101 such that the operator does not erroneously contact the column 101, the inlet-side flow path 103, and the outlet-side flow path 104. The column protection covers 117 are provided with holes through which only the inlet-side flow path 103 and the outlet-side flow path 104 pass when the column 101 is connected to the inlet-side flow path 103 and the outlet-side flow path 104, respectively. When the outer diameters of the inlet-side flow path 103 and the outlet-side flow path 104 are ¹⁄₁₆ inches (≈1.59 mm), a diameter of each hole is preferably about 2 mm.

In order to connect the column 101 to the inlet-side flow path 103 and the outlet-side flow path 104, it is necessary to continuously press the column from the respective flow path sides with a constant force.

Examples of a pressing means include a manual handle, an electric motor, and an air cylinder.

When it is determined that the column 101 is correct in the first reading, the electromotive lock 116 is released (the distal end rod of the electromotive lock 116 moves to a position at which the linear motion of the inlet-side flow path 103 and the outlet-side flow path 104 is not restricted), and the inlet-side flow path 103 and the outlet-side flow path 104 can be connected to the column 101.

Figure 3:
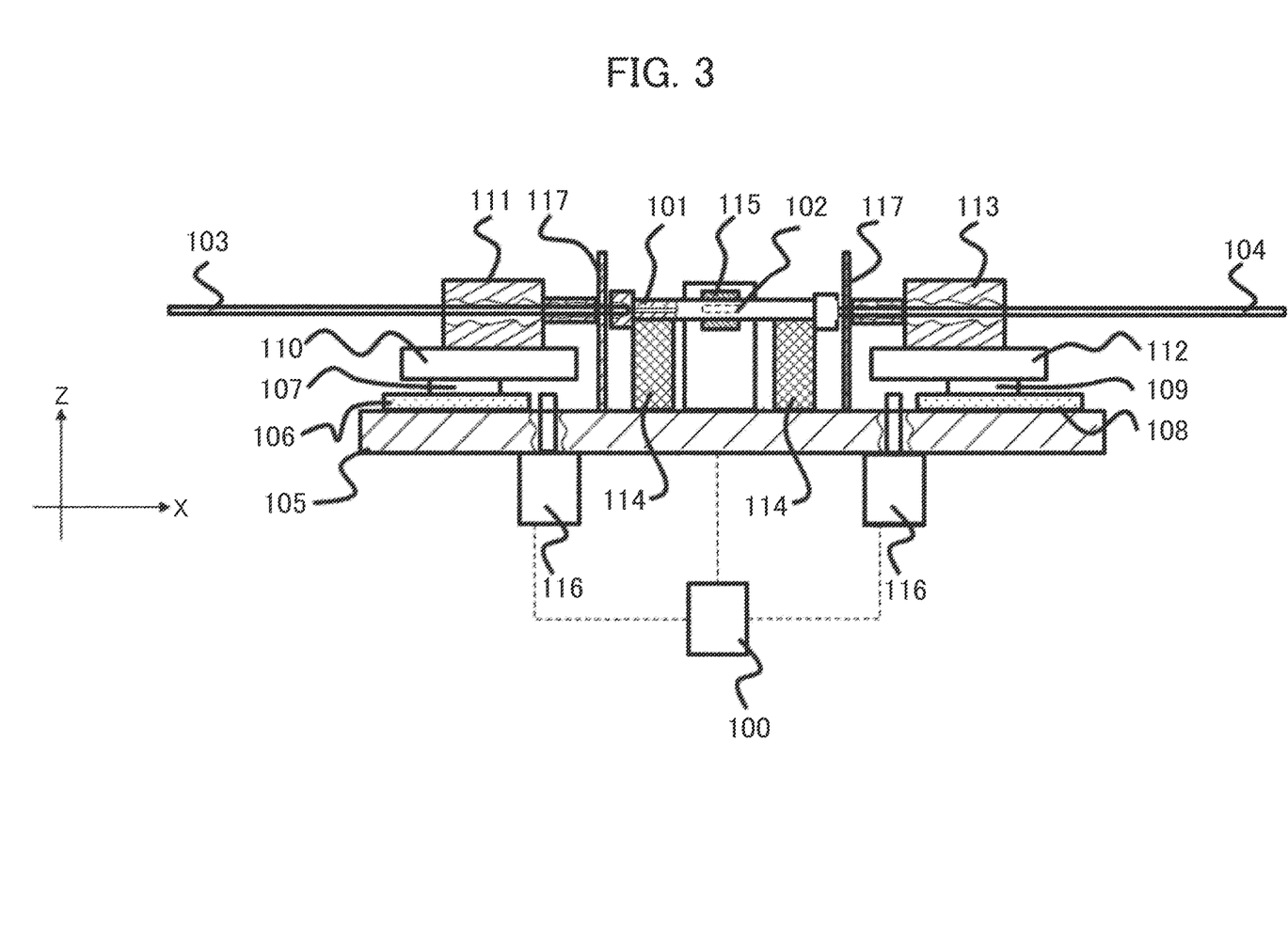
FIG. 3 is a front view (when a column and a flow path are connected) according to Embodiment 1.

FIG. 3 illustrates a state in which the column 101 is connected to the inlet-side flow path 103 and the outlet-side flow path 104. When it is determined that there is an error in the first reading, the electromotive lock 116 is not released (the distal end rod of the electromotive lock 116 remains protruding to a position at which the linear motion of the inlet-side flow path 103 and the outlet-side flow path 104 is restricted). Therefore, the column is removed, and the step is performed again from the installation of the column.

After the connection of the column 101 to the inlet-side flow path 103 and the outlet-side flow path 104, the column tag 102 is read again (second reading), and it is confirmed that the reading is the same as the first reading such that the operator does not erroneously acquire another column after the first reading. When it is determined that there is an error in the second reading, it is necessary to perform a reset operation such as taking out the column 101 from the column rest 114, returning the inlet-side flow path 103 and the outlet-side flow path 104 to the state before the connection (initial position), and bring the rod of the electromotive lock 116 into an extending state, and thus it is desirable to detect an initial position using a photo interrupter as an example.

A control unit 100 receives results of the first reading and the second reading by the reading device 115 and controls an operation of the electromotive lock 116. The control unit 100 may store in advance information necessary for verifying correctness of the installed column 101, or may acquire the information from outside. The control unit 100 does not need to be provided in the column connection mechanism, and may be an external control device.

After the above steps, a mobile phase and an analysis sample are fed to the column 101, and an analysis is performed by chromatography.

Figure 4:
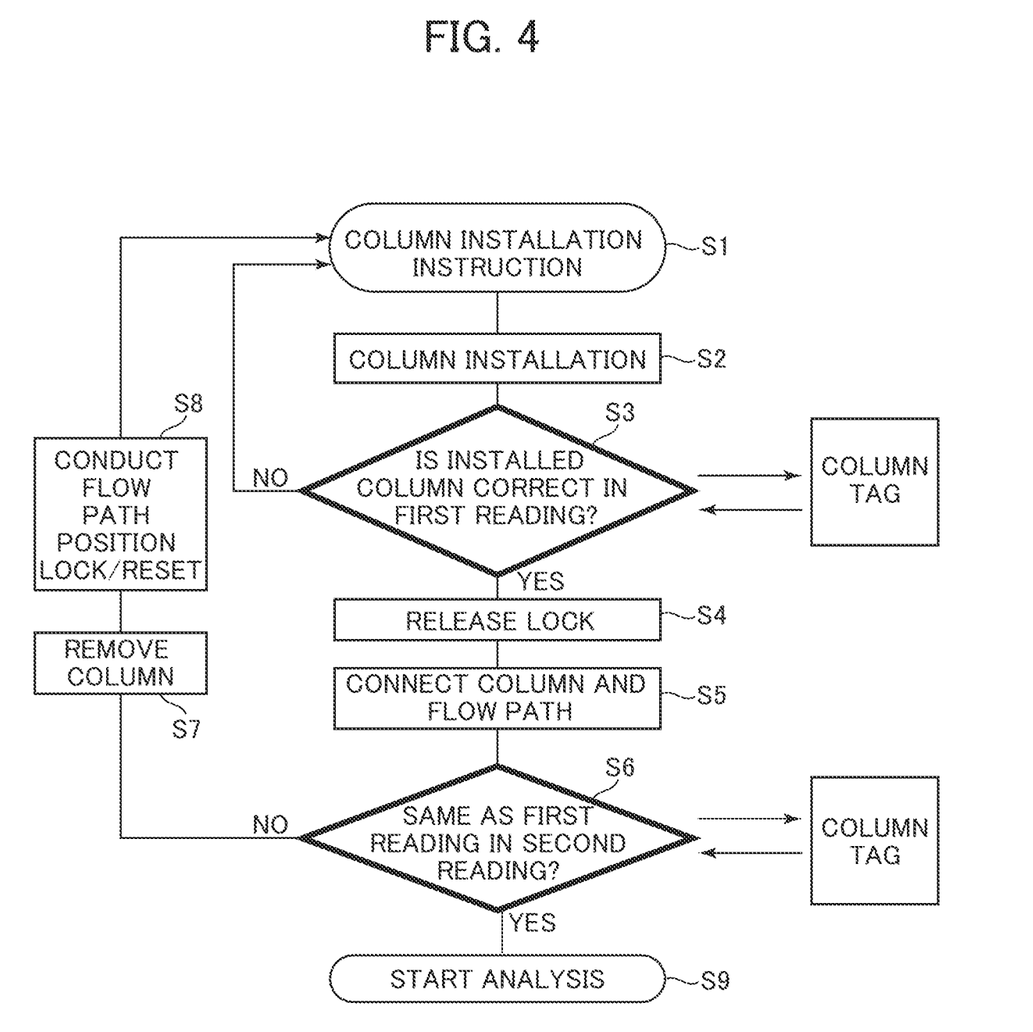
FIG. 4 is a flowchart of column connection according to Embodiment 1.

FIG. 4 is a flowchart in which the column is connected to the analysis flow path.

A column installation instruction is notified (S1), a user installs a column (S2), and the first reading is performed to read a column tag of the installed column and to judge whether the installed column is correct (S3).

In the first reading (S3), when it is judged that the installed column is incorrect (No), the process returns to the notification of the column installation instruction (S1). When it is judged that the installed column is correct (Yes), unlocking for releasing the electromotive lock 116 is performed (S4).

Thereafter, column-flow path connection is performed to connect the column 101 to the inlet-side flow path 103 and the outlet-side flow path 104 (S5), and the second reading is performed to read the column tag of the column connected to the flow path and judge whether the connected column is correct (S6).

In the second reading (S6), when it is judged that the connected column is incorrect (No), through that the column is taken out (S7) and that the positions of the inlet-side flow path 103 and the outlet-side flow path 104 are returned, and the flow path position and the lock reset are performed to cancel the release of the electromotive lock 116 (S8), the process returns to the notification of the column installation instruction (S1). When it is judged that the connected column is correct (Yes), the feeding of liquid or heating to the column 101 is permitted, and the analysis using the column 101 can be started (S9). These control operations may be performed by the control unit 100 or another control device.

Embodiment 2

Figure 5:
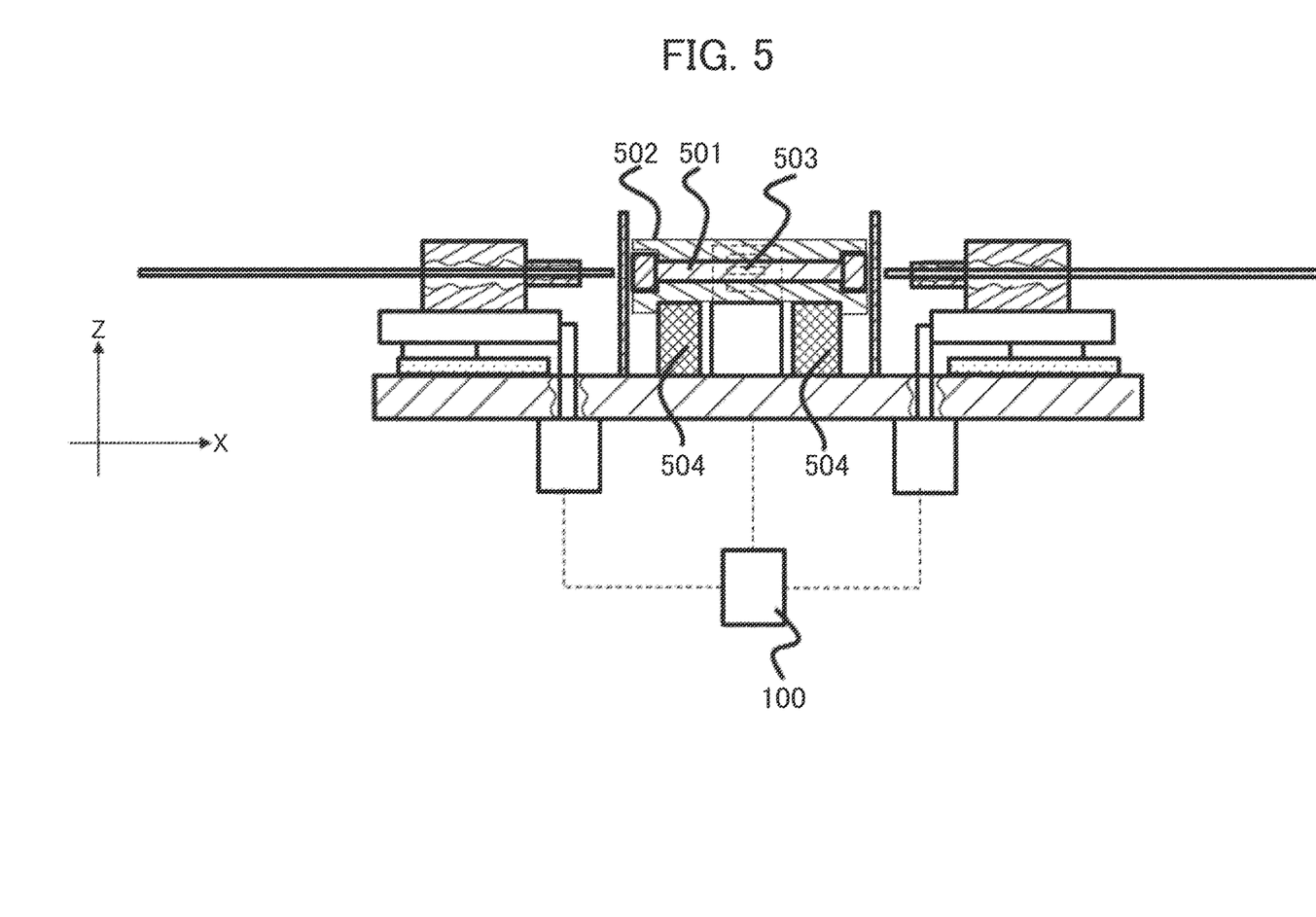
FIG. 5 is a front view of a column connection mechanism according to Embodiment 2.
Figure 6:
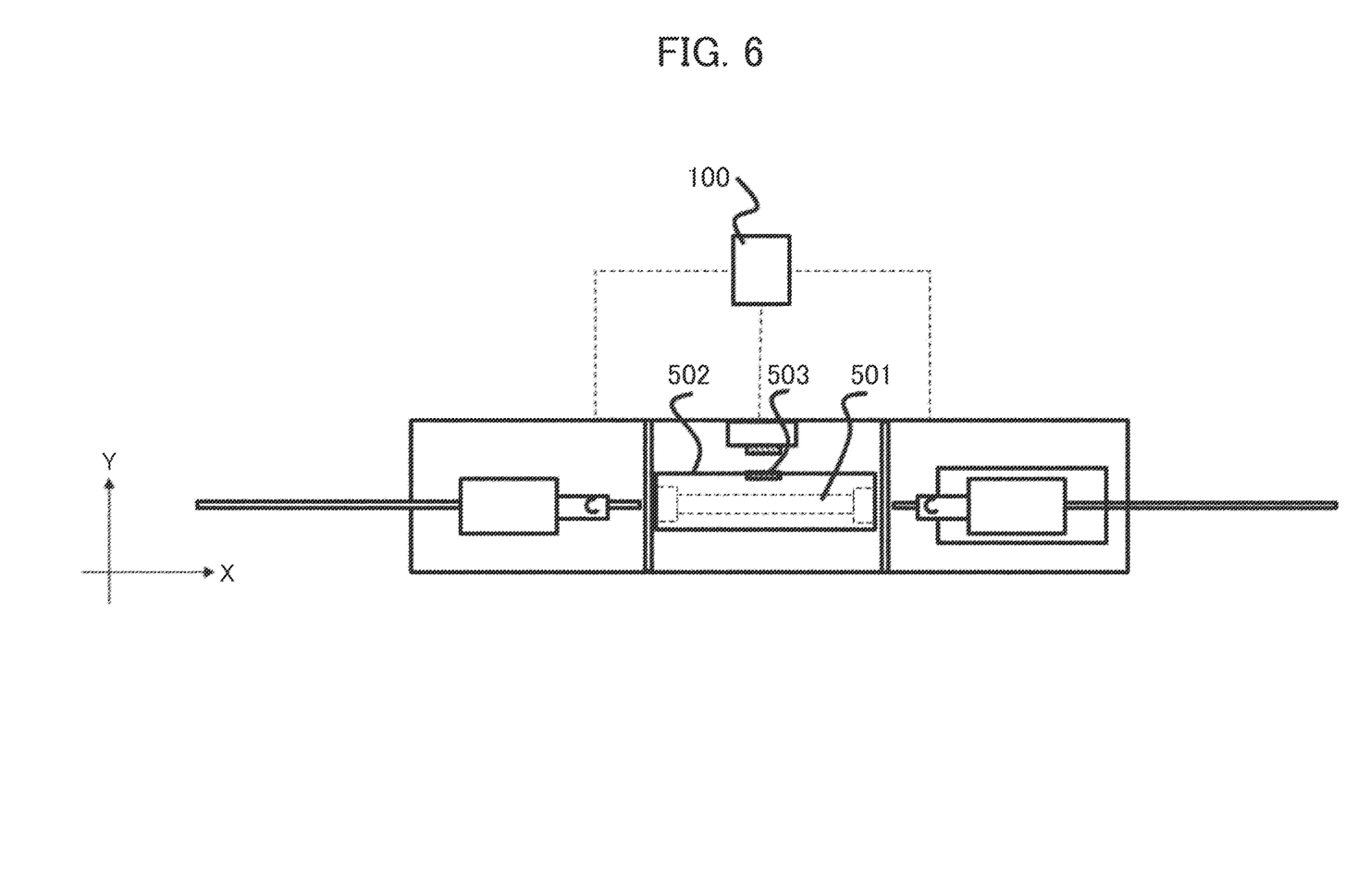
FIG. 6 is a top view of the column connection mechanism according to Embodiment 2.

FIG. 5 (front view) and FIG. 6 (top view) illustrate an exchange mechanism in which a column 501 is sealed in a cartridge 502 and a column tag 503 is provided on the cartridge 502. A configuration other than the cartridge 502, the column tag 503, and the column cartridge rest 504 and an exchange step are the same as those shown in FIGS. 1, 2, and 3.

According to the present embodiment, since the column tag 503 is provided on the column cartridge, it is possible to easily implement a positional relation in which the column tag is parallel to the reading device.

According to the above embodiments, a mechanism, is provided, in which the identification information of the column is read before the connection with the analysis flow path, the correctness of the column is determined, and the column and the flow path cannot be connected when the determination is incorrect. Thus, the mistakenly installed column by an operator can be kept as the unused column.

The invention is not limited to the above embodiments, and includes various modifications. For example, the above embodiments have been described in detail for easy understanding of the invention, and the invention is not necessarily limited to those including all configurations described above. A part of a configuration of one embodiment can be replaced with a configuration of another embodiment, and a configuration of another embodiment can be added to a configuration of one embodiment. A part of the configuration of each embodiment may be added to, deleted from, or replaced with another configuration.

REFERENCE SIGNS LIST

100: control unit
101: column
102: column tag
103: inlet-side flow path
104: outlet-side flow path
105: exchange mechanism base
106: inlet-side guide rail
107: inlet-side guide block
108: outlet-side guide rail
109: outlet-side guide block
110: inlet-side flow path base
111: inlet-side flow path guide block
112: outlet-side flow path base
113: outlet-side flow path guide
114: column rest
115: reading device
116: electromotive lock
117: column protection cover
501: column
502: column cartridge
503: column tag
504: column cartridge rest

The invention claimed is:

1. A column connection method of a liquid chromatograph, comprising:
a first step of installing a column at a column installation part and reading identification information of the column before connecting the column with an analysis flow path to obtain a first reading result; and
a second step of connecting the column with the analysis flow path and reading identification information of the column to obtain a second reading result,
wherein the first reading result is compared with the second reading result to judge identity of the column.

2. The column connection method of a liquid chromatograph according to claim 1,
wherein restriction on a connection between the column and the analysis flow path is released on the basis of the first reading result.

3. The column connection method of a liquid chromatograph according to claim 2,
wherein feeding of liquid from the analysis flow path to the column is permitted on the basis of the second reading result.

4. A liquid chromatograph having a column connection mechanism,
wherein the column connection mechanism includes:
a column installation part at which a column is installed;
a reading device for reading identification information of the column installed at the column installation part;
a flow path moving mechanism for moving and connecting a flow path with respect to the column installed at the column installation part; and
a control unit, and
wherein, after the column is installed at the column installation part, the control unit compares a first reading result obtained from identification information of the column before connecting the column with an analysis flow path with a second reading result obtained from identification information of the column after connecting the column with the analysis flow path, to judge identity of the column.

5. The liquid chromatograph according to claim 4,
wherein the column connection mechanism further includes an electromotive lock, and
wherein, on the basis of the first reading result, the control unit control the electromotive lock so as to release restriction on a connection between the column and the analysis flow path.

6. The liquid chromatograph according to claim 5,
wherein the control unit permits feeding of liquid from the analysis flow path to the column on the basis of the second reading result.

* * * * *